United States Patent [19]

Allor et al.

[11] Patent Number: 4,995,281
[45] Date of Patent: Feb. 26, 1991

[54] LIGHTWEIGHT ROCKER ARM

[75] Inventors: Richard L. Allor, Livonia; John A. Herman, Sr., Trenton; George C. DeBell, Plymouth, all of Mich.

[73] Assignee: Ford Motor Company, Dearborn, Mich.

[21] Appl. No.: 386,755

[22] Filed: Jul. 31, 1989

[51] Int. Cl.$^5$ .............................................. G05G 1/10
[52] U.S. Cl. ........................................ 74/559; 74/569; 123/90.44
[58] Field of Search ........................ 74/569, 519, 559; 123/90.39, 90.33, 90.44, 90.51

[56] References Cited

U.S. PATENT DOCUMENTS

| | | | |
|---|---|---|---|
| 3,502,058 | 3/1970 | Thompson | 123/90.43 X |
| 3,563,216 | 2/1971 | Uemura | 74/559 X |
| 3,826,155 | 7/1974 | Muller | 74/519 |
| 4,147,074 | 4/1979 | Noguchi et al. | 74/559 |
| 4,216,682 | 8/1980 | Ban et al. | 74/579 E |
| 4,430,969 | 2/1984 | Holtzberg et al. | 123/90.39 |
| 4,438,738 | 3/1984 | Kosuda et al. | 74/519 X |
| 4,476,824 | 10/1984 | Reinke et al. | 123/90.39 |
| 4,598,675 | 7/1986 | Long | 123/90.51 |
| 4,614,171 | 9/1986 | Malhotra | 123/90.44 |
| 4,624,223 | 11/1986 | Wherry et al. | 123/90.44 |
| 4,627,392 | 12/1986 | Tashiro | 123/90.39 |
| 4,674,453 | 6/1987 | Dove, Jr. | 74/519 X |
| 4,697,473 | 6/1987 | Patel | 74/519 |
| 4,727,832 | 3/1988 | Miyamura et al. | 74/519 X |
| 4,738,231 | 4/1988 | Patel et al. | 123/90.39 X |
| 4,803,766 | 2/1989 | Akao et al. | 123/90.39 X |
| 4,829,647 | 5/1989 | Anderson et al. | 74/559 X |
| 4,840,150 | 6/1989 | Kotzab et al. | 123/90.39 |
| 4,841,922 | 6/1989 | Taniguchi et al. | 123/90.39 X |
| 4,850,095 | 7/1989 | Akao et al. | 74/569 X |
| 4,856,466 | 8/1989 | Ting et al. | 123/90.44 X |

FOREIGN PATENT DOCUMENTS

| | | | |
|---|---|---|---|
| 57-79534 | 5/1982 | Japan | 74/519 |
| 58-85312 | 5/1983 | Japan | 123/90.44 |
| 62-38810 | 2/1987 | Japan | . |
| 63-173807 | 7/1988 | Japan | 123/90.39 |
| 63-179106 | 7/1988 | Japan | 123/90.39 |

Primary Examiner—Rodney M. Lindsey
Attorney, Agent, or Firm—Joseph W. Malleck; Roger L. May

[57] ABSTRACT

A rocker arm of the cam follower type has a rocker arm body formed of a metal matrix composite material comprising a lightweight metal, preferably aluminum, having ceramic material mixed therein. The rocker arm may take the form of a "slider" arm which included a pad for slideably engaging a cam on a rotating cam shaft for pivotally moving the rocker arm to operate an associated valve. For a slider rocker arm, the cam engaging pad comprises a wear resistant ceramic material which may be integrally formed into the rocker arm or otherwise secured thereto after forming. Alternately, the rocker arm may take the form of a "roller" rocker arm wherein a roller formed of a first ceramic material is rotatably mounted on an axle formed of a second ceramic material and mounted between sidewalls of the rocker arm body. One or both ceramic materials may be porous and self-lubricating when impregnated with a solid or liquid lubricant. A variety of hardening techniques, coatings and inserts may be provided as required.

13 Claims, 1 Drawing Sheet

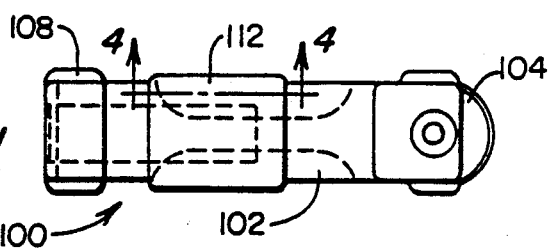
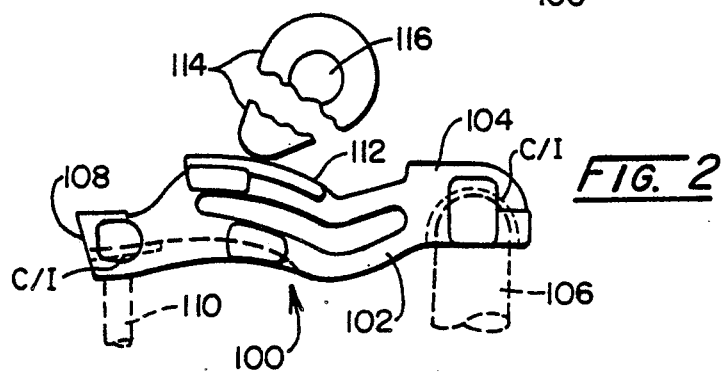
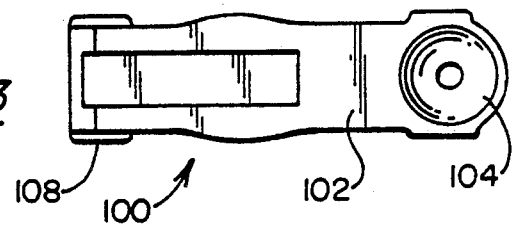
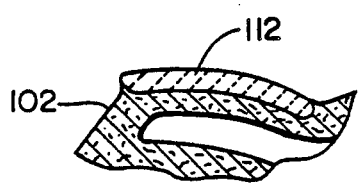
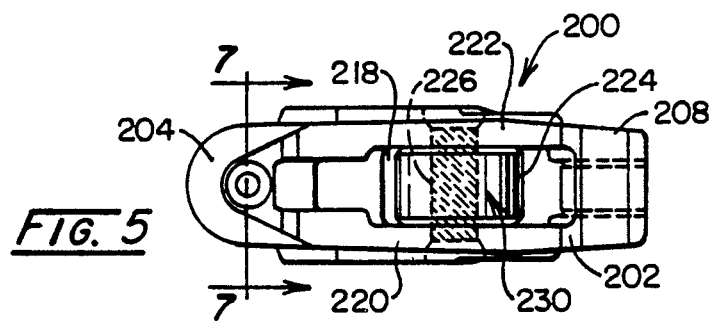
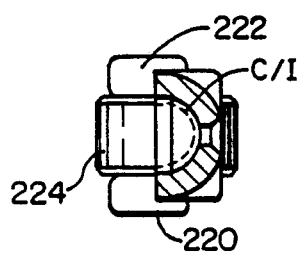
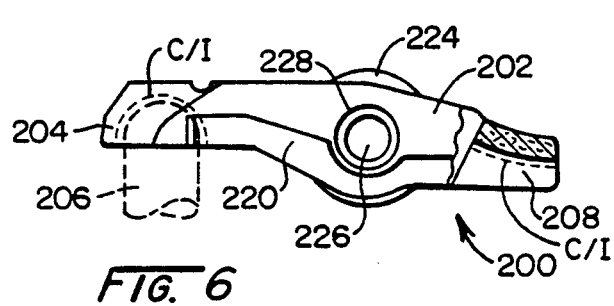

LIGHTWEIGHT ROCKER ARM

BACKGROUND OF THE INVENTION

The present invention relates generally to valve operating rocker arms for internal combustion engines and, more particularly, to an improved lightweight rocker arm of the cam follower type.

As a consequence of fuel shortages and concern for the environment, the trend in the automotive industry for many years has been to reduce the fuel consumption of and the generation of pollutants by modern automobiles. To accomplish these goals, the sizes and weights of automobiles have been generally reduced and the engines made more efficient. With higher engine efficiencies, typically due to more accurate control both of fuel input and ignition, engines can also be reduced in size to further contribute to weight reduction. In addition to engine size, the engine components can themselves be reduced in weight with such weight reductions also contributing to engine performance, particularly where components of the movable valve system are affected.

To this end, aluminum alloy rocker arms have been used in the prior art as disclosed, for example, in U.S. Pat. No. 4,147,074 and Japan No. 62-38810. To help ensure light weight, sliding surfaces of the disclosed rocker arms are formed as small inserts of steel alloy or a composite layer where infra-metallic compound particles are scattered in the aluminum alloy matrix, respectively. Cam follower rocker arms are disclosed in U.S. Pat. Nos. 4,614,171 and 4,697,473 wherein machined metal cam rollers are preferably supported for rotation within the rocker arms by needle bearings. The former cam follower rocker arm is formed to ensure proper lubrication of the arm while the later is formed to present a low profile and reduced friction such that, among other benefits, the weight of the rocker arm can be reduced.

While the known structures contribute to the provision of light weight, efficiency and high performance of modern engines, there is a continuing need for improvements in the automotive industry to further enhance engine performance and efficiency, and to further reduce the weight of engines and engine components.

SUMMARY OF THE INVENTION

This need is addressed in accordance with the present invention by a rocker arm of the cam follower type having a rocker arm body formed of metal matrix composite material comprising a lightweight metal, preferably aluminum, having ceramic material mixed therein. The rocker arm may take the form of a "slider" arm which includes a pad for slideably engaging a cam on a rotating cam shaft for pivotally moving the rocker arm to operate an associated valve. For a slider rocker arm, the cam engaging pad comprises a wear resistant ceramic material which is integrally formed into the rocker arm or affixed to the rocker arm after forming by appropriate means. Alternately, the rocker arm may take the form of a "roller" arm wherein a roller formed of a first ceramic material is rotatably mounted on an axle formed of a second ceramic material and mounted between sidewalls of the rocker arm body. A variety of hardening techniques, coatings and inserts may be Provided as required in the present invention.

In accordance with one aspect of the present invention, a lightweight rocker arm of the cam follower type for an internal combustion engine comprises an elongated rocker arm body formed of a metal matrix composite material. The rocker arm body has a first end formed to engage a support upon which the rocker arm pivots and a second end for engaging and activating a valve stem. Cam engaging means formed of a ceramic material and positioned intermediate the first and second ends of the rocker arm body complete the rocker arm and provide for engaging a cam on a rotating cam shaft for pivoting movement of the rocker arm. For a slider rocker arm, the cam engages means comprises a cam engaging pad made of a wear resistant ceramic material, such as silicon nitride, which is integrally formed into the rocker arm body or affixed after forming by adhesive bonding, brazing, interference fit or otherwise.

For a roller rocker arm, the rocker arm body comprises a generally rectangular centralized opening extending between sidewalls of the rocker arm body, and the cam engaging means comprises a roller formed of a first ceramic material and a roller shaft formed of a second ceramic material mounted in circular openings in the sidewalls of the rocker arm body for rotatably supporting the roller. Such a roller rocker arm may be self-lubricating due to the open porosity and/or fluting of the outer surface of the roller shaft. The first ceramic material may comprise sintered silicon nitride and the second ceramic material reaction bonded silicon nitride. If desired, the first and second ceramic materials may be the same.

The metal matrix composite material may comprise aluminum having ceramic material mixed therein to enhance the stiffness of the aluminum. While ceramic material in particulate form may be used, to further enhance the stiffness of the rocker arm body, the ceramic material may be formed as whiskers or fibers. The rocker arm body may be still further stiffened by making the ceramic material into a preform wherein the whiskers or fibers of the ceramic material are substantially aligned with the length dimension of the rocker arm body. In selected applications of the lightweight rocker arm of the present invention, it may be preferred to harden the first and second ends, to coat the first and second ends with wear resistant coatings, or to provide wear resistant inserts for the first and second ends. For example, the wear resistant inserts may be formed of silicon nitride or polymer materials.

It is thus an object of the present invention to provide a lightweight rocker arm of the cam follower type having a rocker arm body formed of a metal matrix composite material which rocker arm body includes cam engaging means formed of a ceramic material; to provide a lightweight rocker arm of the cam follower type having a rocker arm body formed of a metal matrix composite material including a wear resistant ceramic material pad for slideably engaging a cam on a rotating cam shaft; and, to provide a lightweight rocker arm of the cam follower type having a rocker arm body formed of a metal matrix composite material including a roller formed of a first ceramic material and being rotatably mounted on an axle formed of a second ceramic material and mounted between sidewalls of the rocker arm body.

Other objects and advantages of the invention will be apparent from the following description, the accompanying drawings and the appended claims.

BRIEF DESCRIPTION OF THE INVENTION

FIG. 1-3 are a top, side and bottom view, respectively, of a slider rocker arm in accordance with the present invention;

FIG. 4 is a fragmented sectional view on an enlarged scale of the cam engaging pad of the slider rocker arm of FIGS. 1-3 taken along the section line 4—4;

FIGS. 5 and 6 are top and side views, respectively, of a roller rocker arm in accordance with the present invention; and FIG. 7 is a sectioned end view of the roller rocker arm of FIGS. 5 and 6 taken along the section line 7—7.

DETAILED DESCRIPTION OF THE INVENTION

Reference is now made to the drawing figures which illustrate two different embodiments of lightweight cam follower type rocker arms made in accordance with the present invention. FIGS. 1-4 illustrate a slider type rocker arm 100 while FIGS. 5-7 illustrate a roller type rocker arm 200. The slider rocker arm 100 comprises an elongated rocker arm body 102 which is formed of a metal matrix composite (MMC) material comprising a lightweight metal, such as magnesium or preferably aluminum, with selected amounts of ceramic material mixed therein. The ceramic material in the MMC takes the form of particulates, whiskers or fibers to enhance desirable characteristics of the rocker arm body 102, such as strength, durability and stiffness.

The stiffness tends to be generally increased as the form of the ceramic material is changed from particulate to whiskers to fibers and can be further increased by use of preforms having whiskers or fibers substantially aligned with the rocker arm body axis. In the case of aluminum, the preferred percentage range of aluminum to ceramic material is 80% to 20%. Similar percentage ranges apply for other lightweight materials which can be used in the present invention, such as magnesium, as will be apparent to those skilled in the art. The actual percentage of lightweight material used is also dependent on the type and form of ceramic material used in the MMC material.

The ceramic material used to form the MMC material may comprise among others alumina, silicon carbide, silicon nitride or boron carbide. As previously noted, the ceramic material may take a variety of forms with whiskers or fibers preferably oriented by means of a preform providing a stiffer rocker arm. Where a ceramic preform is used to construct rocker arms in accordance with the present invention, the rocker arms are preferably die cast at an appropriate pressure to ensure complete penetration of the lightweight metal into the interstices of the preform.

The slider rocker arm 100 can take a variety of forms; however, as shown it is configured as a D8EZ-6564-A sold by the Ford Motor Company. The rocker arm body 102 has a first end 104 formed to engage a support 106, typically a valve lash adjuster, upon which the rocker arm 100 pivots and a second end 108 for engaging and activating a valve stem 110. The rocker arm body 102 also comprises a cam engaging pad 112 intermediate the first end 104 and the second end 108 for engaging a cam 114 on a rotating cam shaft 116 for pivoting movement of the rocker arm 100. The cam engaging pad 112 is made of a wear resistant ceramic material, such as silicon nitride, which is integrally formed into the rocker arm 102 as shown in FIG. 4, or affixed after forming by adhesive bonding, brazing, interference fit or otherwise.

A problem which can arise in the present invention is that the wear surfaces in the first and second ends 104, 108 may form abrasive surfaces after a period of time such that the support 106 and/or the valve stem 110 may be worn. To overcome such potential problems, it may be desirable to modify the first and second ends 104, 108 to prevent the ceramic inclusions from extending out of the wear surfaces to create the abrasive characteristics. For example, the ceramic inclusions may be formed as whiskers or fibers which are oriented in substantial alignment with the wear surfaces, for example by means of a preform, or the MMC material can be hardened in the vicinity of the wear surfaces. Alternately, the wear surfaces can be coated with wear resistant coatings C such as but not limited to tungsten carbide, titanium nitrite, nickel or chrome oxide, or inserts I could be formed into the first and second ends 104, 108 of the rocker arm body 102. If inserts are used, they may be formed of ceramic material such as silicon nitride or silicon carbide, or a polymer material such as polytetraflouroethylene. Coatings and/or inserts are identified in the drawings by the designation C/I.

The roller rocker arm 200 similarly includes a rocker arm body 202 formed of MMC material as previously described relative to the rocker arm 100. However, in the roller rocker arm 200, the rocker arm body 202 further comprises a generally rectangular centralized opening 218 extending between sidewalls 220, 222 of the rocker arm body 202, and the rocker arm 200 further comprises a roller 224 for engaging a cam, such as the cam 114 on a rotating cam shaft, such as the cam shaft 116. The roller 224 is formed of a first ceramic material which may comprise among others sintered silicon nitride, zirconia toughened alumina, silicon carbide, alumina oxide or reaction bonded silicon nitride.

The roller 224 is mounted for rotation on a roller shaft 226 which is mounted in circular openings 228 in the sidewalls 220, 222 of the rocker arm body 202. The roller shaft 226 may be journaled within the openings 228 and retained within the rocker arm body 202 by C-shaped spring washers (not shown) or otherwise retained as will be apparent to those skilled in the art. The roller shaft 226 is formed of a second ceramic material different than the first ceramic material forming the roller 224. One combination of ceramic materials which currently appears very attractive for use in the present invention is sintered silicon nitride (density 3.2 gm/cc) for the roller 224 and reaction bonded silicon nitride (density 2.4-2.6 gm/cc) for the roller shaft 226.

The roller rocker arm 200 can take a variety of forms; however, as shown it is configured as an E7TZ-6564-A arm assembly sold by the Ford Motor Company. By utilizing two differing ceramic materials for the roller 224 and the roller shaft 226, the weight of the roller arm 200 may be dramatically reduced since the ceramic materials selected may be porous and provide a self-lubricating bearing surface interface such that not only is a heavy machined steel roller eliminated but also the steel needle bearings required to support the roller and adding to its weight are also eliminated.

For the disclosed combination of ceramic materials, the reaction bonded silicon nitride of the roller shaft 226 is porous providing natural passageways for the lubrication function. While this combination appears to be preferred at this time, the present invention is not so limited. In particular, the roller may be formed of a porous ceramic material and the shaft formed of a solid ceramic material, or both the roller and the shaft may be formed of a solid or a porous ceramic material with the materials being the same or different materials having similar characteristics.

Lubrication of the roller 224 relative to the roller shaft 226 can be enhanced, if necessary, by providing flutes in the outer surface of the shaft 226 such as the spiraling flutes 230 shown in FIG. 5. While the sizing of the flutes 230 may be selected based on the ceramic material(s) utilized for the present invention, for the disclosed combination, flutes of approximately 0.001" depth and 0.01" width are believed to be adequate. Alternately, the roller shaft 226 could be coated with a lubricating coating such as but not limited to nickel, chrome oxide, titanium nitride or tungsten carbide. The previous description relative to the potential problems of abrasive characteristics of the ends 104, 108 of the rocker arm 100 are equally applicable to ends 204, 208 of the rocker arm 200 as are the previously described solutions.

Having thus described the lightweight rocker arm of the present invention in detail and by reference to preferred embodiments thereof, it will be apparent that modifications and variations are possible without departing from the scope of the invention defined in the appended claims.

What is claimed is:

1. A lightweight rocker arm assembly of the cam follower type for an internal combustion engine comprising:
    an elongated rocker arm body formed of a metal matrix composite material, said rocker arm body having a generally rectangular centralized opening extending between sidewalls thereof, a first end formed to engage a support upon which said rocker arm pivots and a second end for engaging and activating a valve stem; and
    cam engaging means comprising a roller formed of a first ceramic material for engaging a cam on a rotating cam shaft to pivot said rocker arm assembly, said roller being mounted for rotation on a roller shaft formed of a second ceramic material and mounted in circular openings in the sidewalls of said rocker arm body intermediate said rocker arm body first and second ends.

2. A lightweight rocker arm assembly of the cam follower type for an internal combustion engine as claimed in claim 1 wherein the outer surface of said roller shaft has open porosity to be self lubricating.

3. A lightweight rocker arm assembly of the cam follower type for an internal combustion engine as claimed in claim 1 wherein the outer surface of said roller shaft is fluted to be self lubricating.

4. A lightweight rocker arm assembly of the cam follower type for an internal combustion engine as claimed in claim 1 wherein said first and second ceramic materials are the same ceramic material.

5. A lightweight rocker arm assembly of the cam follower type for an internal combustion engine as claimed in claim 1 wherein said first ceramic material comprises sintered silicon nitride and said second ceramic material comprises reaction bonded silicon nitride.

6. A lightweight rocker arm assembly of the cam follower type for an internal combustion engine as claimed in claim 5 wherein said metal matrix composite material comprises aluminum having ceramic material mixed therein to stiffen said rocker arm body.

7. A lightweight rocker arm assembly of the cam follower type for an internal combustion engine as claimed in claim 6 wherein said ceramic material is formed as whiskers or fibers.

8. A lightweight rocker arm assembly of the cam follower type for an internal combustion engine as claimed in claim 7 wherein said ceramic material comprises a preform to substantially align whiskers or fibers of said ceramic material with the length dimension of said rocker arm body to stiffen said rocker arm body along its length dimension.

9. A lightweight rocker arm assembly of the cam follower type for an internal combustion engine as claimed in claim 8 wherein said first and second ends are hardened.

10. A lightweight rocker arm assembly of the cam follower type for an internal combustion engine as claimed in claim 8 wherein said first and second ends are coated with wear resistant coatings.

11. A lightweight rocker arm assembly of the cam follower type for an internal combustion engine as claimed in claim 8 further comprising first and second wear resistant inserts for said first and second ends, respectively.

12. A lightweight rocker arm assembly of the cam follower type for an internal combustion engine as claimed in claim 11 wherein said wear resistant inserts are formed of silicon nitride.

13. A lightweight rocker arm assembly of the cam follower type for an internal combustion engine as claimed in claim 11 wherein said wear resistant inserts are formed of polymer materials.

* * * * *